United States Patent [19]
Hiramatsu et al.

[11] Patent Number: 5,697,504
[45] Date of Patent: Dec. 16, 1997

[54] VIDEO CODING SYSTEM

[75] Inventors: Ryosuke Hiramatsu, Chigasaki; Hitoshi Yoneda, Kawasaki, both of Japan

[73] Assignee: Kabushiki Kaisha Toshiba, Kawasaki, Japan

[21] Appl. No.: 364,252

[22] Filed: Dec. 27, 1994

[30] Foreign Application Priority Data

Dec. 27, 1993 [JP] Japan ................... 5-348868

[51] Int. Cl.$^6$ ........................................... B07C 5/00
[52] U.S. Cl. ................ 209/546; 209/584; 209/900; 382/102; 382/311
[58] Field of Search .................. 209/546, 584, 209/900; 382/101, 102, 100, 137, 138, 311

[56] References Cited

U.S. PATENT DOCUMENTS

| | | | |
|---|---|---|---|
| 4,632,252 | 12/1986 | Haruki et al. | 209/900 X |
| 4,641,753 | 2/1987 | Tamada . | |
| 5,031,223 | 7/1991 | Rosenbaum et al. | 209/584 X |
| 5,151,948 | 9/1992 | Lyke et al. | 382/138 |

FOREIGN PATENT DOCUMENTS

| | | | |
|---|---|---|---|
| 589119 | 3/1994 | European Pat. Off. | 209/584 |
| 2591512 | 6/1987 | France | 209/546 |
| 60-137476 | 7/1985 | Japan . | |
| 259192 | 11/1987 | Japan | 382/311 |

*Primary Examiner*—Boris Milef
*Attorney, Agent, or Firm*—Cushman Darby & Cushman IP Group of Pillsbury Madison & Sutro LLP

[57] ABSTRACT

The video coding system picks up the whole image of postal matter, inputs the picked image to a character/code & image reader to read a user code on the postal matter, prints bar code information corresponding to the read result on the postal matter, and sorts the postal matter according to the bar code information. In this system, a display device displays the whole image of postal matter from which the user code cannot be read, and user code candidate characters, together with a user code input area for inputting the user code, an image of a specific user code location, and images of a plurality of user code candidate areas. An operator inputs the user code, which the character/code & image reader failed to read, in the user code input area while visually checking the displayed whole image and the images of the user code candidate areas. The input user code is stored in a memory.

23 Claims, 12 Drawing Sheets

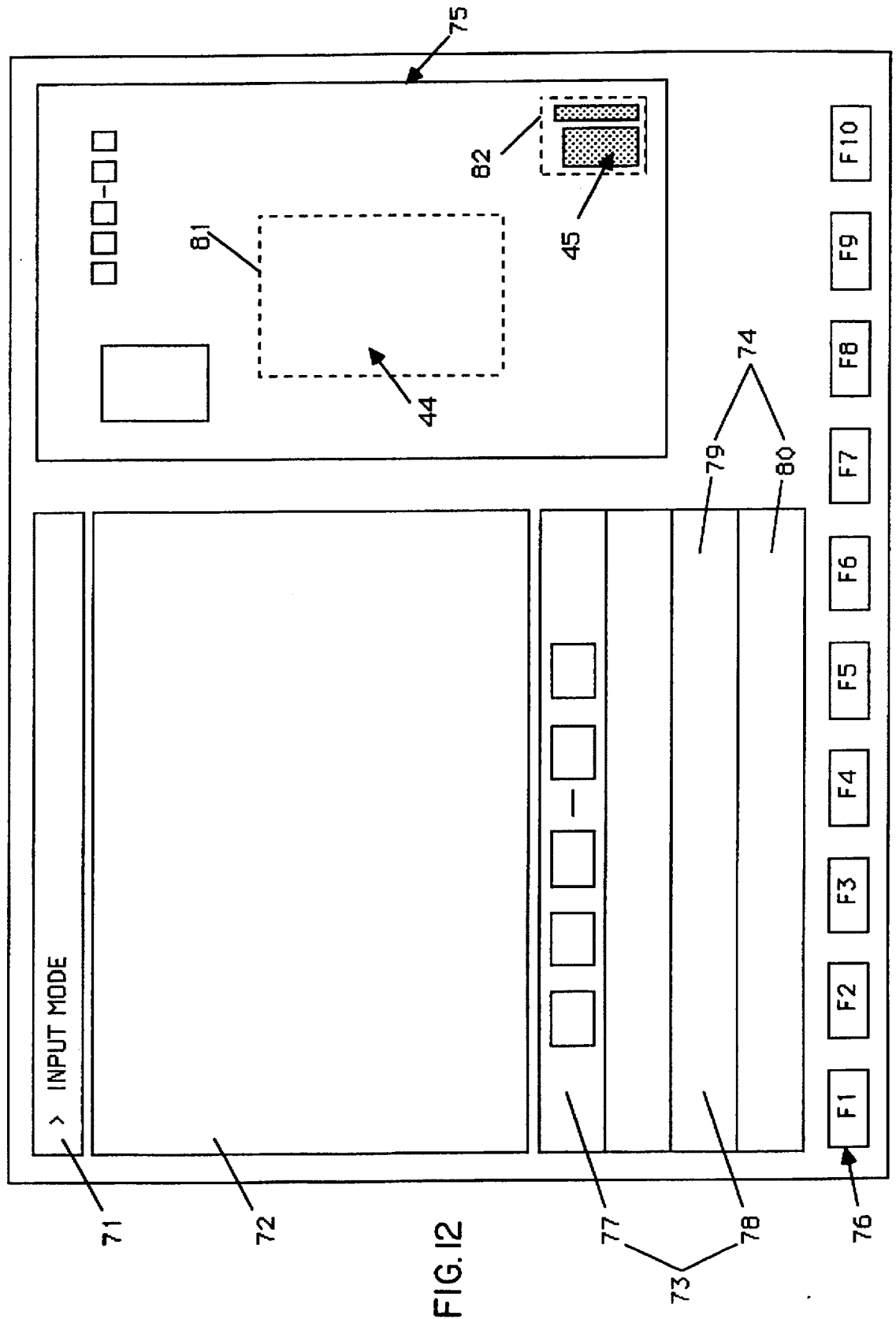

VIDEO CODING SYSTEM

BACKGROUND OF THE INVENTION

1. Field of the Invention

The present invention relates to a postal matter processing system for reading a user code written in a specific user code location set on postal matter in advance, which indicates an address printing bar code information corresponding to the read user code on the postal matter, and sorting the postal matter on the basis of the bar code information more particularly, the present invention relates to an improvement in a video coding system for allowing the operator to input a user code with respect to rejected postal matter, from which the user code cannot be read, while visually checking the whole image of the postal matter.

2. Description of the Related Art

Recently, a postal matter processing apparatus serving also as a video coding apparatus has been developed. A postal matter processing apparatus of this type reads, for example, address information (a zip code and address information) written on postal matter using an optical character reader, converts the address information into bar code information, and prints the bar code information on the postal matter, thereby sorting the postal matter in units of delivery zones on the basis of the bar code information. An example of such a postal matter processing apparatus is disclosed in U.S. Pat. No. 4,641,753 (Tamada).

The whole image of a rejected postal matter from which address information cannot be read is displayed on a display device of the video coding apparatus. When displayed the operator inputs address information while visually checking the display screen of the display device, and the address information is converted into bar code information. The bar code information is then printed on the postal matter. The postal matter is automatically sorted on the basis of the bar code information. This operation compensates for the limit of mechanical sorting performed by the optical character reader.

In the conventional video coding apparatus, however, when the address information of postal matter cannot be read, and the postal matter is rejected, the operator reads the whole image of the postal matter and manually inputs all the address information, thereby coding the information. Therefore, the efficiency of coding is poor, and a long-time operation invites fatigue and operation errors of the operator.

SUMMARY OF THE INVENTION

It is, therefore, an object of the present invention to provide a video coding system which allows the operator to perform a coding operation efficiently and tirelessly within a short period of time.

To achieve the above object, a video coding system of the present invention comprises:

a) means for obtaining an image of a postal matter having a specific user code area for which available is a user code representing an address;

b) means for recognizing the user code of the postal matter from the image obtained by the obtaining means, wherein when the recognizing means has not recognized the user code completely, the postal matter being subjected to an incomplete recognition is rejected as a rejected postal matter;

c) means for receiving information pieces from the recognizing means when the recognizing means incompletely recognizes the user code of the postal matter, the information pieces including whole image information representing a whole image of the rejected postal matter, attribute information including not less than zero candidate character obtained as a result of the incomplete recognition for the rejected postal matter, specific code location information representing the specific user code area of the rejected postal matter, and candidate area information representing a candidate area for the user code of the rejected postal matter other than the specific user code area;

d) means for displaying display items in response to the whole image information, attribute information, specific code location information, and candidate area information respectively received by the receiving means, the display items including a whole view of the whole image of the rejected postal matter, a code area view of the specific user code area extracted from the whole view, a candidate area view of the candidate area extracted from the whole view, and a user code input area containing the candidate character; and e) means for inputting a corrective or supplemental character to the user code input area displayed at the displaying means so as to provide a corrected user code, an input operation of the corrective or supplemental character by the inputting means being performed with reference to visual information obtained from at least one of the whole view, code area view, and candidate area view respectively displayed at the displaying means.

According to the present invention, when a user code is written in a specific user code location set on postal matter in advance, a result of recognition including partly read characters and obtained by the recognizing means is displayed at a user code input area. With this operation, a user code input operation can be performed by correcting only a read-failed portion. Therefore, the keystroke count (key input count) is decreased, and the operation efficiency is improved. Since the display positions of an image of the specific user code location and a user code input area are close to each other, the operator need not visually check the displayed whole image and move his/her eyes (gaze). Therefore, the operator can quickly input a user code without much eyestrain.

Even if a user code is not written at the specific user code location of postal matter, the user code can be quickly found by displaying a plurality of user code candidate areas which are considered to include the user code. Therefore, the operator does not suffer from much fatigue in this user code search operation, and the operation efficiency can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a view showing a case wherein the post-card shown in FIG. 2 is displayed on display device 32 in FIG. 5.

DETAILED DESCRIPTION OF THE PREFERRED EMBODIMENTS

An embodiment of the present invention will be described below with reference to the accompanying drawings.

Figure 1:
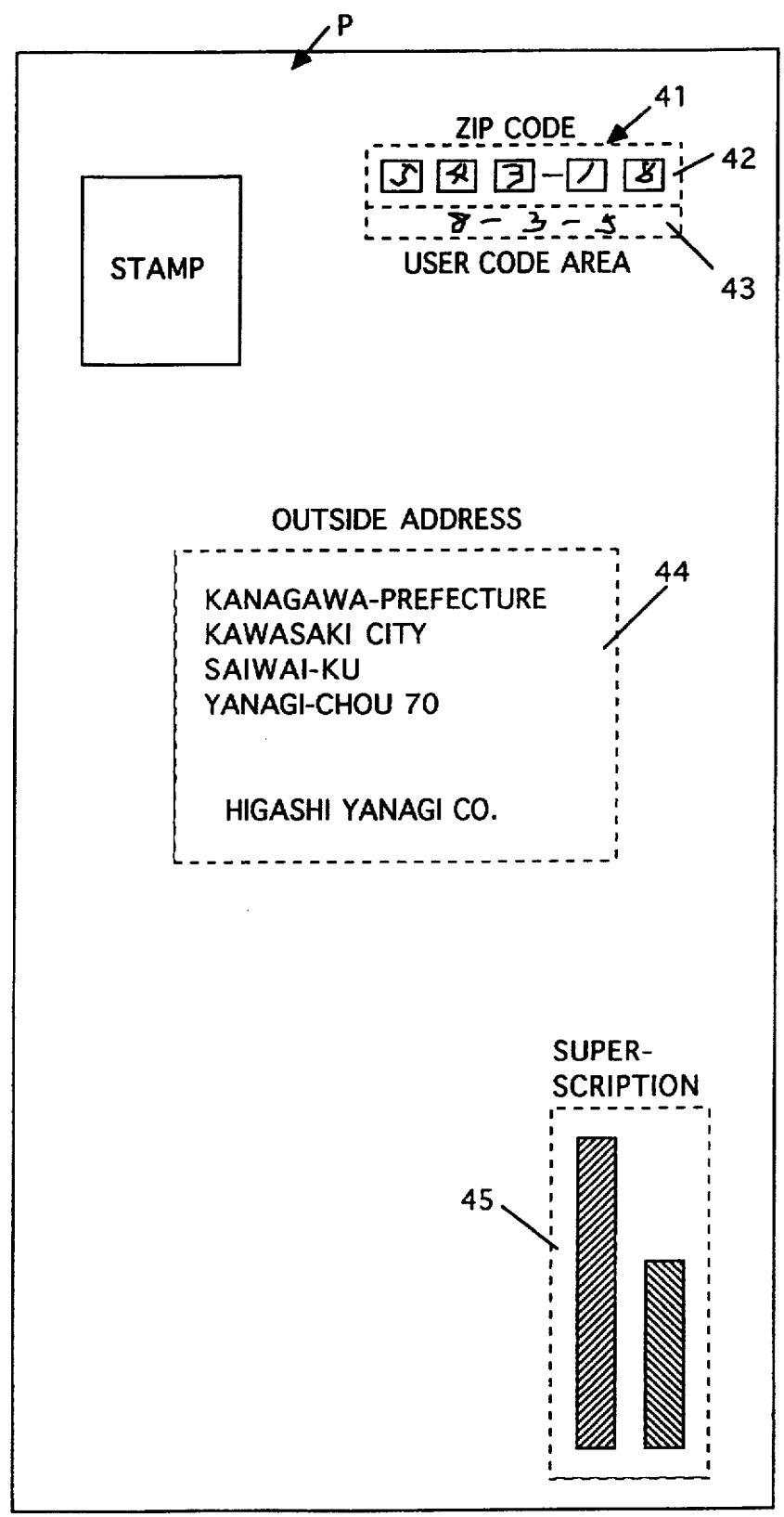
FIG. 1 is a view showing an example of information written on the upper surface of an envelope.
Figure 2:
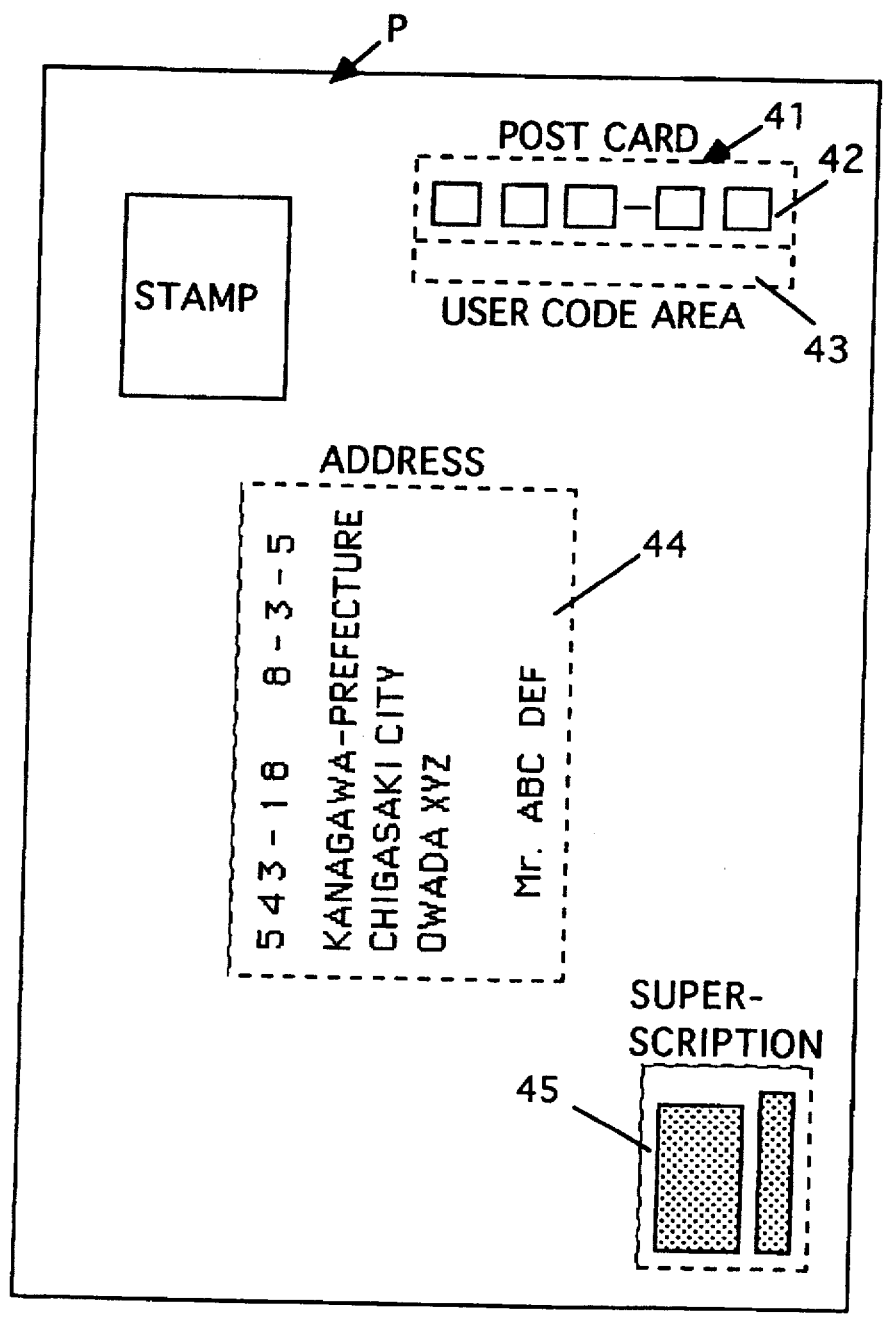
FIG. 2 is a view showing an example of information written on the upper surface of a postcard.

FIGS. 1 and 2 show postal matter according to this embodiment. FIG. 1 shows an example of handwritten postal matter (an envelope) P. Specific user code location 41 is set in advance to be adjacent to a postage stamp position (postage stamp surface). In specific user code location 41, a user code (a division of city/ward/town/village+district number) is written in place of a conventional zip code and/or address information. Specific user code location 41 is constituted by advanced specific zip code location 42, in which a zip code consisting of five digits (including a division of city/ward/town/village written within, e.g., a red frame) is written, and specific address code location 43, in which a specific address code (a division of district number written immediately below the red frame as specific zip code location 42) is written.

Reference numeral 44 denotes an address information area, in which address information is written. In general, this area is the first candidate area (1st user code candidate area) in which a user code is written with the highest possibility other than in specific user code location 41.

Reference numeral 45 denotes an area in which an advertisement, a return address, and the like are printed. In general, this area is the second candidate area (2nd user code candidate area) in which a user code is written with the second highest possibility other than in specific user code location 41.

The above possibility that a user code is written can be determined on the basis of statistics on a large quantity of postal matter processed by the postal matter processing apparatus for a predetermined period of time in the past.

FIG. 2 shows an example of printed postal matter (postcard) P. Similar to handwritten postal matter, specific user code location 41 is set on the surface of postal matter P in advance. In the postcard, however, a user code ("543-18 8-3-5" in this case) is not written in specific user code location 41 but is often written as address information in address information area 44 by printing, as shown in FIG. 2. Reference numeral 45 denotes a second candidate area.

Figure 3:
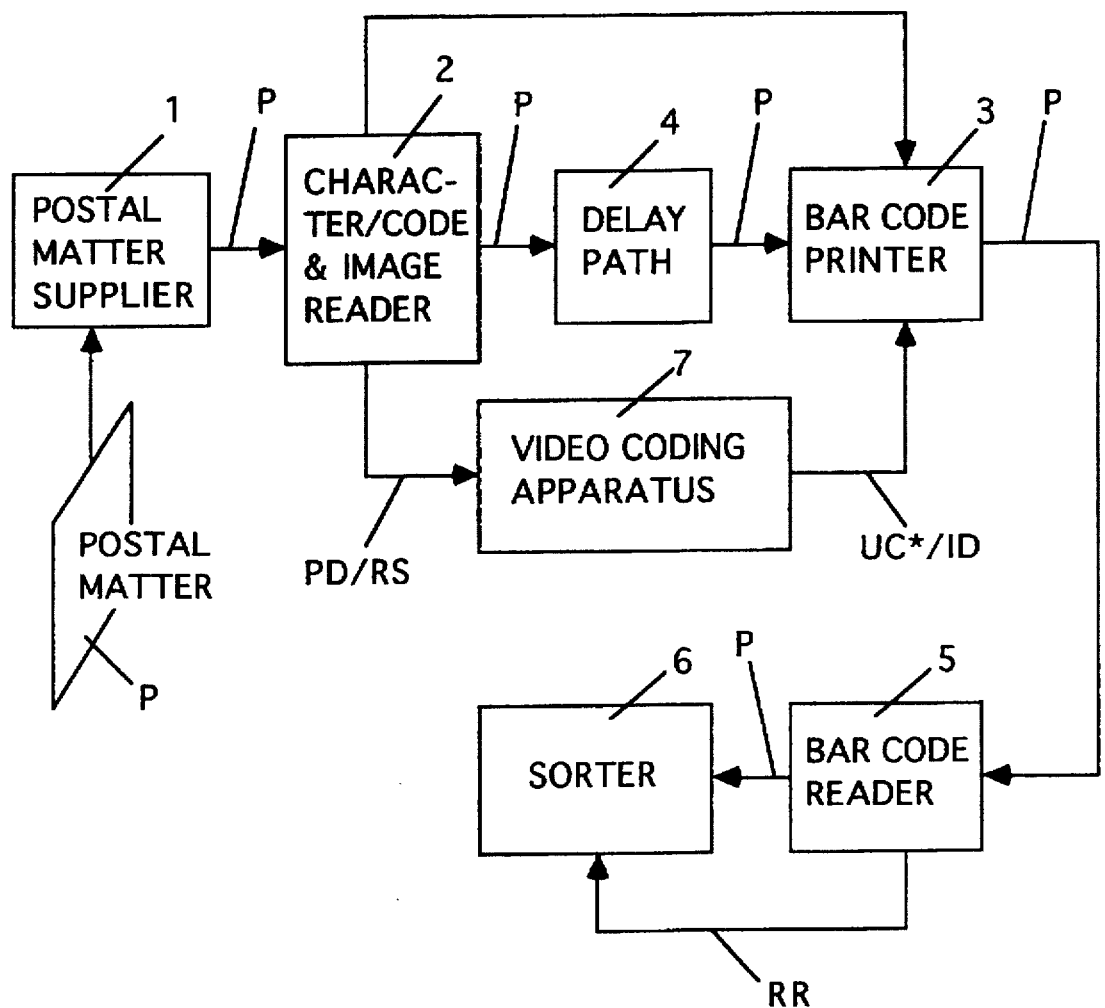
FIG. 3 is a block diagram schematically showing an automatic postal matter sorting apparatus (postal matter processing apparatus) including a video coding apparatus.

FIG. 3 schematically shows the arrangement of a postal matter processing apparatus to which a video coding system according to an embodiment of the present invention is applied. Postal matter P like the one shown in FIG. 1 or 2 is set, in large quantities, in postal matter supplier 1 altogether. Postal matter supplier 1 supplies set postal matter P one by one to character/code & image reader 2.

Character/code & image reader 2 reads a whole image on supplied postal matter P to read a user code written on postal matter P on the basis of the read image. Upon reading user code UC, character/code & image reader 2 outputs user code UC to bar code printer 3. At this time, character/code & image reader 2 outputs a serial number (to be referred to as an ID number hereinafter) corresponding to each postal matter P to bar code printer 3.

Postal matter P from which user code UC is read by character/code & image reader 2 is conveyed to bar code printer 3 via delay path 4 which is constituted by a long convey path to delay conveyance of postal matter P to the next stage. Bar code printer 3 converts user code UC from character/code & image reader 2 into bar code information, and prints the bar code information on postal matter P while checking postal matter P which is caused to correspond to the above ID number.

Postal matter P on which the bar code information is printed by bar code printer 3 is supplied to bar code reader 5. Bar code reader 5 reads and decodes the bar code information printed on postal matter P, and supplies read result RR to sorter 6, together with postal matter P. Sorter 6 sorts postal matter P in units of delivery zones on the basis of read result RR from bar code reader 5.

Postal matter P from which user code UC cannot be read by character/code & image reader 2 is rejected. With regard to rejected postal matter P, reject signal RS is supplied to video coding apparatus 7, together with postal matter data PD (to be described in detail later) such as the whole image, ID number, and attribution information (classification of a postcard/envelope, classification of handwriting/printing, and the like), candidate character information as the result of recognition in specific user code location 41, and the information in user code candidate areas 44 and 45 other than specific user code location 41. Reject signal RS is also supplied to bar code printer 3.

Video coding apparatus 7 (to be described in detail later) displays the whole image of postal matter P from character/code & image reader 2. An operator inputs (a full input or correction/supplement input operation) the correct user code of rejected postal matter P by operating a keyboard or mouse while visually checking the displayed image. After input user code UC* is verified, it is sent to bar code printer 3.

While a code input operation is performed by video coding apparatus 7, postal matter P from which user code UC cannot be read is conveyed to bar code printer 3 via delay path 4 with a delay. Upon receiving reject signal RS from character/code & image reader 2, which corresponds to postal matter P from which user code UC cannot be read, bar code printer 3 converts user code UC* input by video coding apparatus 7 into bar code information, and prints this bar code information on postal matter P which is caused to correspond to an ID number.

Since subsequent operations are the same as those in the above case wherein user code UC can be read from postal matter P, a description thereof will be omitted.

Note that an apparatus corresponding to the arrangement shown in FIG. 3 is disclosed in detail in U.S. Pat. No. 4,641,753 (Tamada). The whole disclosure of U.S. Pat. No. 4,641,753 is incorporated in the application of the present invention.

Figure 4:
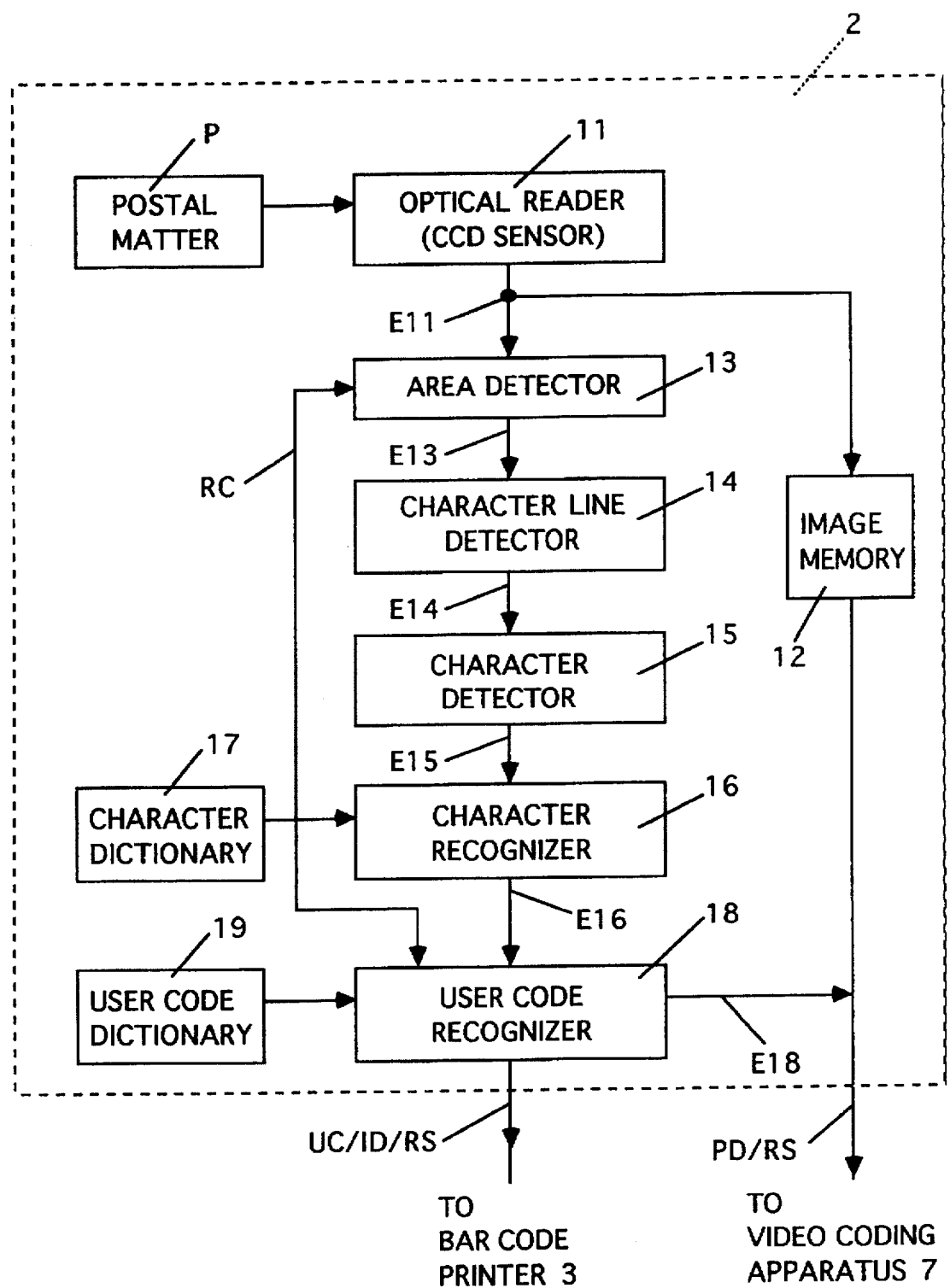
FIG. 4 is a block diagram showing the internal arrangement of character/code & image reader 2 in FIG. 3.

FIG. 4 shows the arrangement of character/code & image reader 2. Optical reader 11 irradiates light from a light source onto postal matter P supplied from postal matter supplier 1, and converts light reflected by postal matter P into an electrical signal through a CCD line sensor or the like. Optical reader 11 then picks up the whole image of postal matter P by digitizing the electrical signal.

Whole image E11 of postal matter P, picked up by optical reader 11, is temporarily stored in image memory 12 and supplied to area detector 13. Area detector 13 detects specific user code location 41 on postal matter P from input whole image E11 of postal matter P. In addition, upon receiving retry command RC from user code recognizer 18 (to be described later), area detector 13 detects a specific user code location (44 or 45) other than specific user code location 41 from the input image of postal matter P.

Output E13 from area detector 13 is sent to character line detector 14. Character line detector 14 detects a character line from an image in a detected area by obtaining, e.g., a projection pattern in the horizontal direction.

More specifically, the image in specific user code location 41 in FIG. 1 is sequentially and horizontally scanned downward by CCD sensor 11. In this scanning operation, if at least one black pixel having a sufficient density is present on a scan line, it is determined that there is a projection on the line. Otherwise, it is determined that there is no projection on the line. A character line is detected from the projection pattern obtained in this manner.

Note that such character line/character detection is disclosed in detail in U.S. Pat. No. 4,481,665 (Ota). The whole disclosure of U.S. Pat. No. 4,481,665 is incorporated in the application of the present invention.

Output E14 from character line detector 14 is supplied to character detector 15. Character detector 15 detects characters one by one by obtaining, e.g., a projection pattern in the vertical direction. Output E15 from character detector 15 is supplied to character recognizer 16. Character recognized 16 performs recognition processing of the detected characters by referring to character dictionary 17.

Result E16 of recognition from character recognizer 16 is supplied to user code recognizer 18. User code recognizer 18 performs recognition processing of a user code by using a knowledge data base stored in user code dictionary 19. If the user code can be recognized by this recognition processing, user code UC is output to bar code printer 3.

If the user code cannot be recognized by the above recognition processing, user code recognizer 18 supplies retry command RC to area detector 13 to perform recognition processing of the user code again. If the user code cannot be recognized even by this recognition processing, user code recognizer 18 finally determines that the user code cannot be recognized, and outputs reject signal RS to video coding apparatus 7. Reject signal RS indicates that the IC number and the user code corresponding to reject postal matter P cannot be recognized.

In addition, when the user code cannot be recognized, user code recognizer 18 outputs postal matter data PD described above as result E18 of recognition to video coding apparatus 7. Postal matter data PD includes the candidate character information in specific user code location 41, the attribution information (classification of a postcard/envelope, classification of handwriting/printing, and the like) of postal matter P, the coordinate information of specific user code location 41 detected by area detector 13, the coordinate information of a plurality of specific user code locations (i.e., 1st and 2nd user code candidate areas) other than specific user code location 41, and the like.

In addition, user code recognizer 18 outputs an ID number corresponding to postal matter P to bar code printer 3 regardless of whether the user code can be recognized. If the user code is not recognized by user code recognizer 18, the whole image of corresponding postal matter P in image memory 12 is output, as part of postal; matter data PD described above, to video coding apparatus 7.

Note that another example of character/code & image reader 2 is disclosed in U.S. Pat. No. 4,633,502 (Namba). The whole disclosure of U.S. Pat. 4,633,502 is incorporated in the application of the present invention.

Video coding apparatus 7 will be described in detail next.

Figure 5:
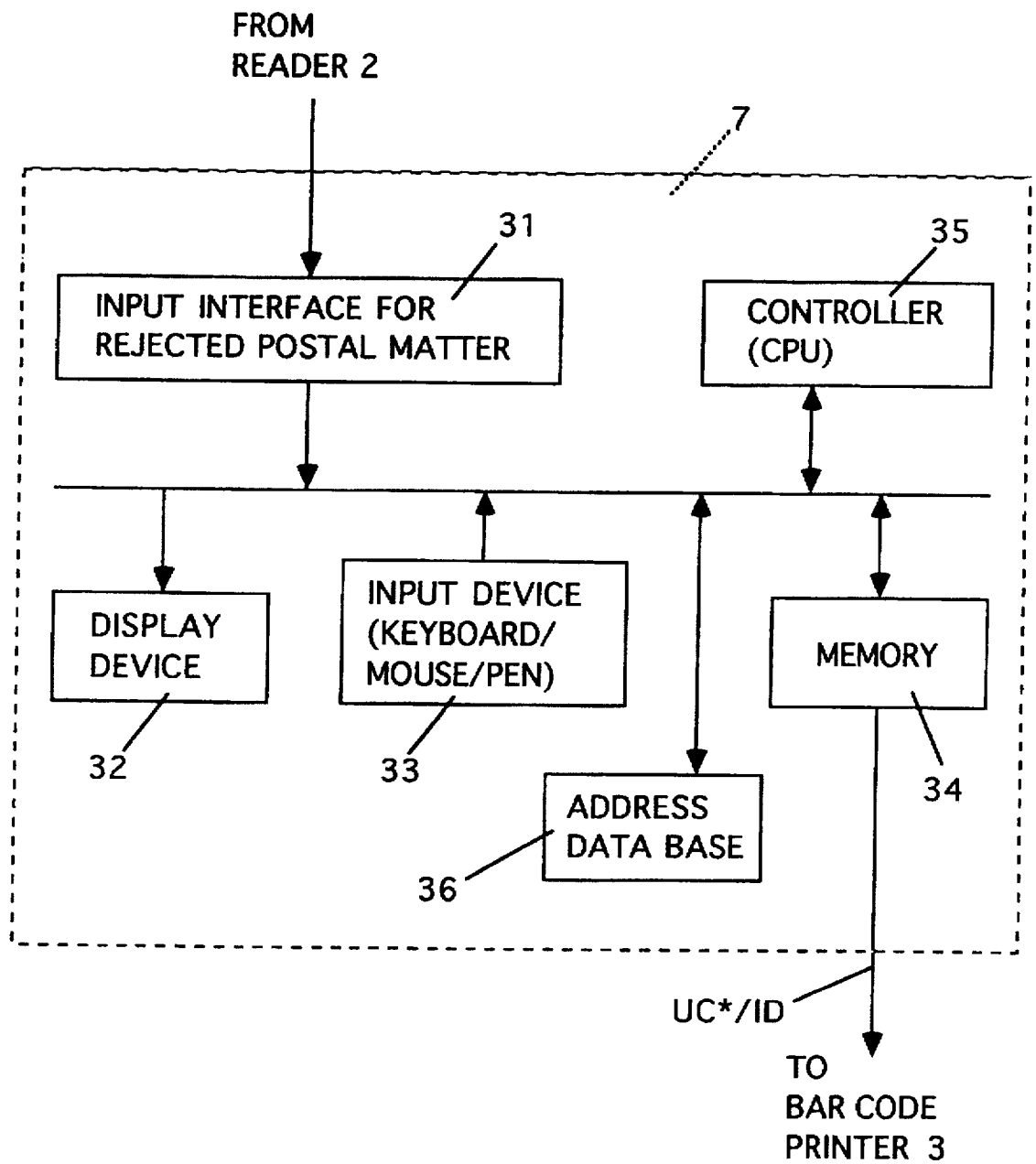
FIG. 5 is a block diagram showing the internal arrangement of video coding apparatus 7 in FIG. 3.

FIG. 5 schematically shows the arrangement of video coding apparatus 7 video coding apparatus 7 is constituted by input interface 31 for rejected postal matter, display device 32 using a CRT or the like, input device 33 using a keyboard, a mouse, or a pen, memory 34, controller 35 for controlling these components as a whole, and address data base 36.

When reject signal RS is generated, input interface 31 receives postal matter data PD as a result of recognition obtained by character/code & image reader 2, e.g., attribution information (classification of a postcard/envelope, classification of handwriting/printing, and the like), the candidate character information in specific user code location 41, the coordinate information of specific user code location 41, and 1st and 2nd user code candidate area information (coordinate information), in addition to the whole image (the contents of image memory 12) of postal matter P from which the user code cannot be read by character/code & image reader 2.

Figure 7:
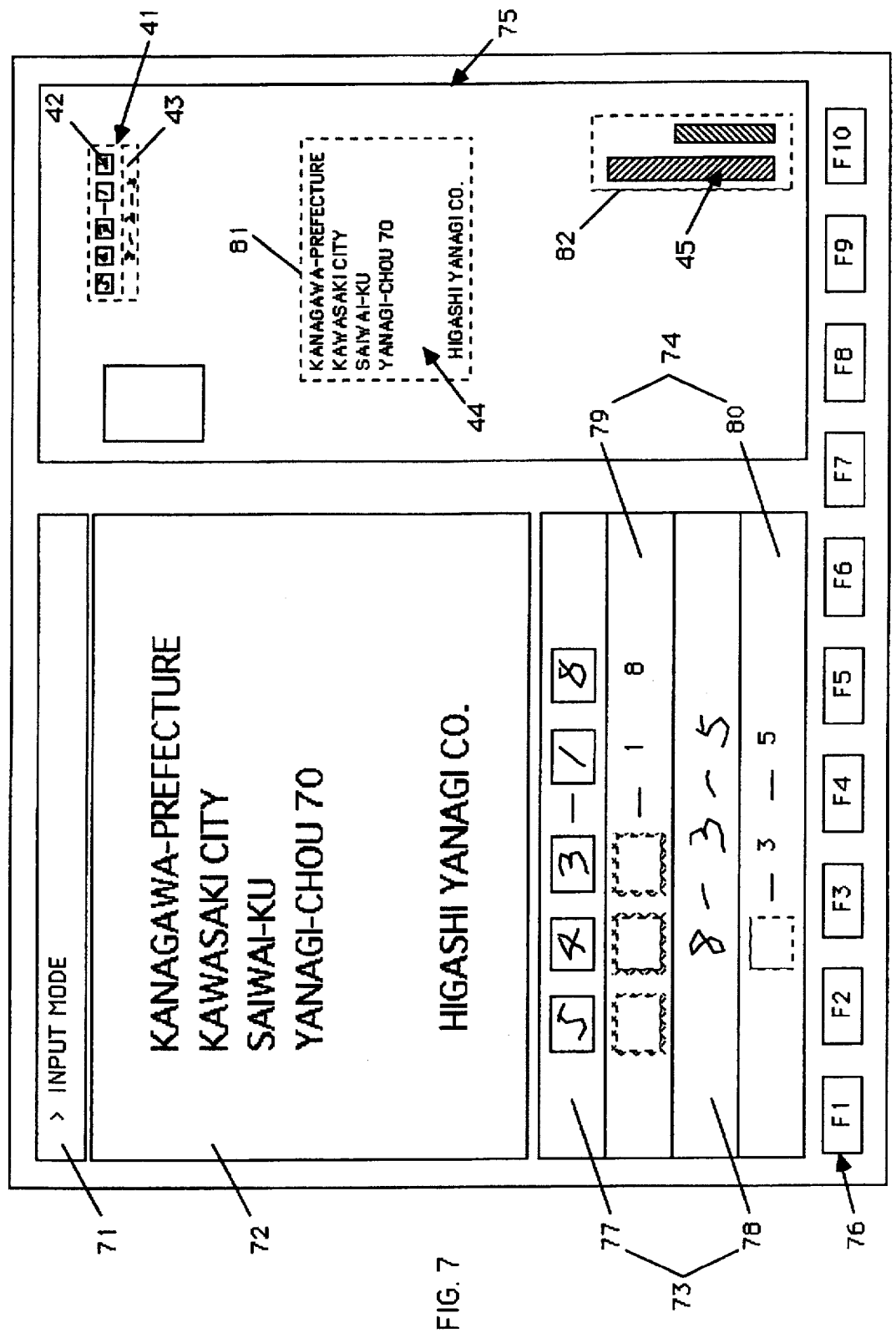
FIG. 7 is a view showing a case wherein the envelope in FIG. 1 is displayed on display device 32 in FIG. 5.

As shown in, e.g., FIG. 7, display device 32 displays whole image 75 of postal matter P, input to input interface 31, user code input area 74 for displaying candidate characters for a user code (zip code+address code) as a result of recognition obtained by character/code & image reader 2, image 73 in a specific user code location, image 72 in 1st user code candidate area, 1st and 2nd user code candidate areas (frames 81 and 82), and the like.

If a user code is written in specific user code location 41, the operator corrects/inputs only a portion (to be corrected) in user code input area 74, displayed by display device 32, through input device 33 while referring to the result of recognition (the contents of image 73 or 72) obtained by character/code & image reader 2. If a user code is written in an area other than specific user code location 41, the operator inputs all the digits of the user code while visually checking the whole image displayed at whole image display area 75. These input operations are performed by using a keyboard or a mouse.

Memory 34 is constituted by, e.g., a large-capacity hard disk. In inputting a user code through input device 33, memory 34 is used to store the input whole image of postal matter P, the result of recognition obtained by character/code & image reader 2, the input user code, and the like, thereby helping the input operation. Address data base 36 for checking the validity of an input user code is stored in a high-speed/large-capacity storage device (e.g., a flash memory array using EEPROMs).

Note that if memory 34 is a hard disk having a sufficiently high speed, address data base 36 may be created in hard disk 34.

Figure 6:
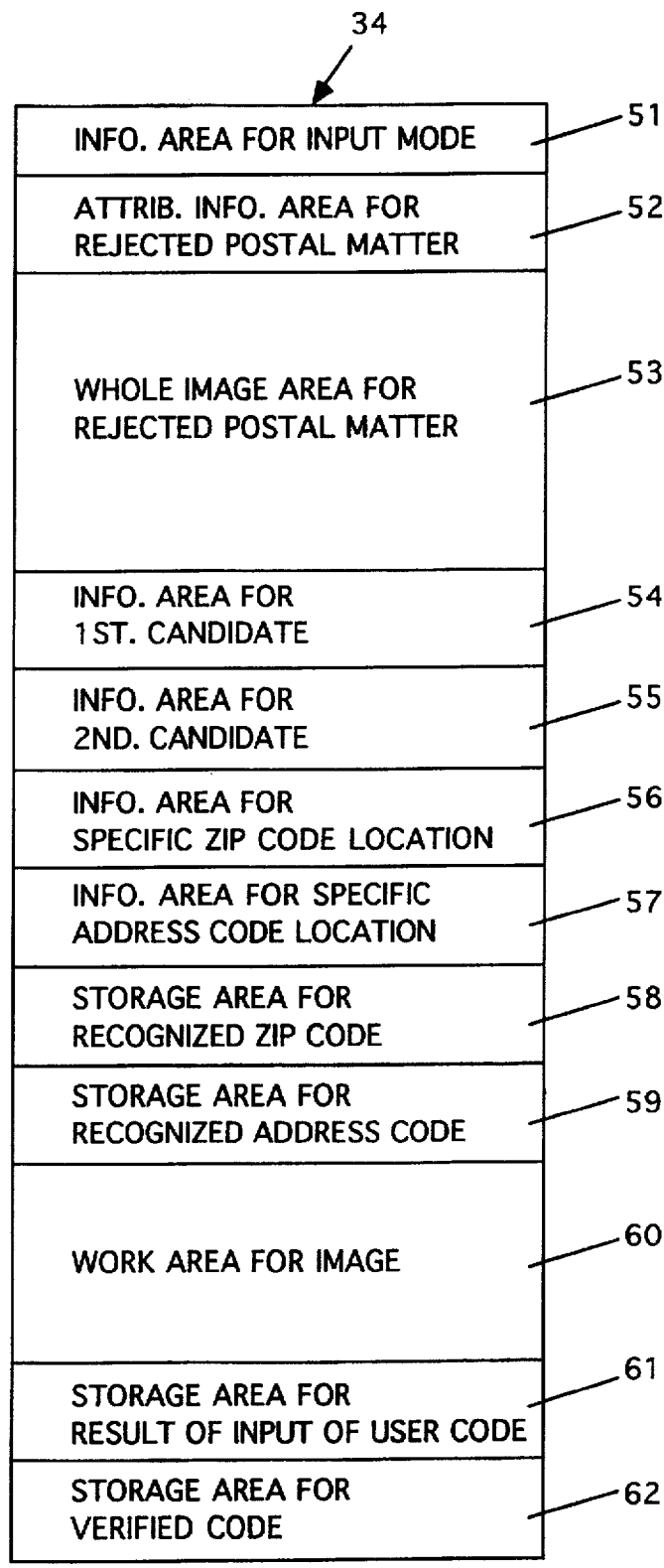
FIG. 6 is a memory map for explaining the contents of memory 34 in FIG. 5.

FIG. 6 shows the memory map of a main portion in memory 34.

Referring to FIG. 6, setting information of an input mode for an input operation performed through input device 33 can be written in input mode information area 51. For example, customized data such as setting information on the authorized user level and image layout change information are stored.

The attribution information of postal matter P as a result of recognition obtained by character/code & image reader 2 with respect to a rejected image is written in attribution information area 52. This attribution information includes, e.g., classification of postcard/envelope and classification of handwriting/printing.

A whole rejected image read by character/code image reader 2 is written in whole image area 53.

The coordinate information (1st user code candidate area information) of an area (e.g., area 44) which is recognized, by character/code & image reader 2, as an area in which a user code is written with the highest possibility other than in specific user code location 41 of the rejected image is written in first candidate information area 54.

The coordinate information (2nd user code candidate area information) of an area (e.g., area 45) which is recognized, by character/code & image reader 2, as an area in which a user code is written with the second highest possibility other than in specific user code location 41 of the rejected image is written in second candidate information area 55.

The coordinate information of specific zip code location 42 of postal matter P is written in specific zip code location information area 56.

The coordinate information of specific address code location 43 of postal matter P is written in specific address code location information area 57.

The result of recognition obtained when character/code & image reader 2 recognizes a zip code from the image in specific zip code location 42 of postal matter P is written in recognized zip code storage area 58.

The result of recognition obtained when character/code & image reader 2 recognizes an address code from the image in specific address code location 43 of postal matter P is written in recognized address code storage area 59.

Image work area 60 is an image processing area used to perform image processing at a high speed when the operator performs an image operation such as rotation, reduction, enlargement, or scrolling by using postal matter P while visually checking an image displayed on display device 32.

A result obtained when the operator recognizes a user code by visually checking the display area (73) of the specific user code location or the whole image display area on display device 32, and inputs the user code through the keyboard of input device 33 is written in input user code storage area 61.

A result obtained by collating the user code input by the operator through the keyboard with address data base 36 is written in verified code storage area 62.

FIG. 7 shows an example of the operation screen displayed on display device 32. This screen is constituted by system display area 71, image display area 72 of specific user code candidate area 44 or 45, image display area 73 of the specific user code location, user code input area 74, whole image display area 75, and function key assignment display area 76.

System display area 71 serves to mainly display a message indicating switching of target postal matter (e.g., "NEW MAIL" or "CODING IS COMPLETED") to be notified to the operator in performing an operation.

Image display area 72 of a user code candidate area (44 or 45) is used to display an image of an area (first user code candidate area 44) which is recognized, by character/code & image reader 2, as an area in which a user code is written with the highest possibility. Of a plurality of candidate frames (first and second candidate frames) 81 and 82 displayed on whole image display area 75, an image of a range slightly broader than a candidate frame designated by the operator is enlarged/displayed.

Note that an area designated by candidate frame 81 of first candidate area 44 recognized by character/code & image reader 2 is displayed at area 72 on the initial screen (default screen). If an image displayed at image display area 72 is not proper (e.g., the image is rotated from the erect position, a character goes out of the screen, or the displayed characters are too small), an image operation such as rotation, enlargement, or reduction can be performed.

Image display area 73 of specific user code location 41 is divided into two areas, i.e., image display area 77 of specific zip code location 42 and image display area 78 of specific address code location 43. These areas are displayed in different colors to allow the operator to quickly recognize them.

In image display area. 77 of specific zip code location 42, an image (e.g., a red frame area) in area 42 is enlarged/displayed. In image display area 78 of specific address code location 43, an image (an area immediately below the red frame area) in area 43 is enlarged/displayed.

User code input area 74 is displayed immediately below image display area 73 of specific user code location 41 to be adjacent thereto. User code input area 74 is divided into two areas, i.e., zip code input area 79 and address code input area 80. These areas are displayed in different colors to allow the operator to quickly recognize them.

In zip code input area 79, the result of recognition obtained by character/code & image reader 2 with respect to a zip code is displayed. In address code input area 80, the result of recognition obtained by character/code & image reader 2 with respect to an address code is displayed.

In whole image display area 75, the whole image of rejected postal matter P from character/code & image reader 2 is always reduced/displayed. The operator can perform an image operation such as rotation, enlargement, reduction, and scrolling with respect to a whole image in area 75. In addition, candidate frames (first and second candidate frames) 81 and 82 surrounded with frames and displayed as areas considered to include a user code are superimposed on the whole image of rejected postal matter P. In this case, the operator can designate a candidate frame (81 or 82). An image in the designated candidate frame (e.g., 81) is displayed at image display area 72 of the user code candidate area.

Function key assignment display area 76 serves to display function keys F1 to F10 to which frequently used commands are respectively assigned. Functions such as rotation (90°, 180°, 270°), enlargement, reduction, screen scrolling, and rejection are assigned to these function keys.

The operation of the apparatus having the above arrangement will be described next with reference to the flow charts shown in FIGS. 8 to 10.

A first example in which a user code is written in specific user code location 41 will be described below.

In this case, the user code is handwritten in most cases. Sometimes, an address code is not written in specific address code location 43 (immediately below the red frames) but is written, as address information, in first user code candidate area 44.

Assume that rejected postal matter P to be processed in this embodiment is a handwritten envelope like the one shown in FIG. 1. Consider a case wherein the user code of postal matter P to be processed is "543-18 (zip code), 8-3-5 (address code)", but a wrong result of recognition "648-18, 3-3-5" is obtained by character/code & image reader 2. In this case, read-failed portions correspond to the first and third digits ("5" and "3") of the upper three digits of the zip code, and the first digit ("8") of the address code.

When video coding apparatus 7 in FIG. 5 is started, the result of recognition (various attribution information of postal matter P, the candidate character information in specific user code location 41, the coordinate information of specific user code location 41, first and second user code candidate area information (coordinate information), and the like) obtained by character/code & image reader 2 is stored in attribution information area 52, whole image area 53, first candidate information area 54, second candidate information area 55, specific zip code location information area 56, specific address code location information area 57, and the like in memory 34, in addition to the whole image of postal matter P rejected by character/code & image reader 2 (i.e., postal matter P, supplied from character/code & image reader 2, from which a user code cannot be read) (step ST1).

When the above information is written in memory 34, a message "NEW MAIL" is displayed at system display area 71 of display device 32 (step ST2). It is then checked, on the basis of the attribution information in attribution information area 52 in memory 34, whether postal matter P is a postcard or an envelope (step ST3). A display magnification is determined from the determination result. In this embodiment, for example, 80% size display is performed in the postcard mode, wherein 60% size display is performed in the envelope mode.

If the type of postal matter P and a display magnification are determined in step ST3, and 80% size display is to be performed, the flow advances to step ST4. In step ST4, the whole image in whole image area 53 is read out from memory 34 and is displayed at whole image display area 75 of display device 32 at a reduction ratio of 80%. If 60% size display is to be displayed (envelope mode), the flow advances to step ST5. In step ST5, the whole image in whole image area 53 of memory 34 is read out and displayed at whole image display area 75 of display device 32 at a reduction ration of 60%. Note that in whole image display area 75, the whole image of rejected postal matter P is always displayed in the center of the screen.

When the whole image of postal matter P is displayed at whole image display area 75, the respective pieces of coordinate information in first and second candidate information areas 54 and 55 of memory 34 are read out. First and second candidate frames 81 and 82 enclosed with light sky blue broken frames are superimposed at whole image display area 75 of display device 32 on the basis of the respective pieces of coordinate information (step ST6). Frames 81 and 82 include two user code candidate areas 44 and 45 in which a user code is included with a high possibility. This color display of the broken frames helps the operator to quickly search for a user code from the whole image of postal matter P. Note that second candidate frame 82 is displayed with a line of a color and type different from those of the other frame so as to be discriminated therefrom (for example, if first candidate frame 81 is displayed with a light sky blue broken line, second candidate frame 82 is displayed with a light blue broken line).

Subsequently, the coordinate information in first candidate information area 54 of memory 34 is read out, and an address for reading out image data from whole image area 53 is determined on the basis of the coordinate information. An image of the first user code candidate area is picked up from whole image area 53 on the basis of the determined address, and the picked UP image is displayed at image display area 72 of the user code candidate area of display device 32 at a magnification of 100% (step ST7). The operator can perform an image operation such as rotation, reduction, enlargement, and scrolling at image display area 72.

If a user code is present in second user code candidate area 45, the function key for selecting one of first and second candidate frames 81 and 82 is operated to display an image of the second user code candidate area (i.e., the image in second candidate frame 82) at area 72.

When an image of first user code candidate area 44 is displayed in this manner, data is read out from specific zip code location information area 56 of memory 34 to display handwritten image information "543-18" at image display area 77 of specific zip code location 42 at a magnification of 100% (step STS).

Subsequently, data is read out from specific address code location information area 57 of memory 34 to display handwritten image information "8-3-5" at image display area 78 of specific address code location 43 of display device 32 at a magnification of 100% (step ST9).

In this case, image display area 77 of specific zip code location 42 and image display area 78 of specific address code location 43 are displayed in color to allow the operator to easily recognize them.

Figure 8:
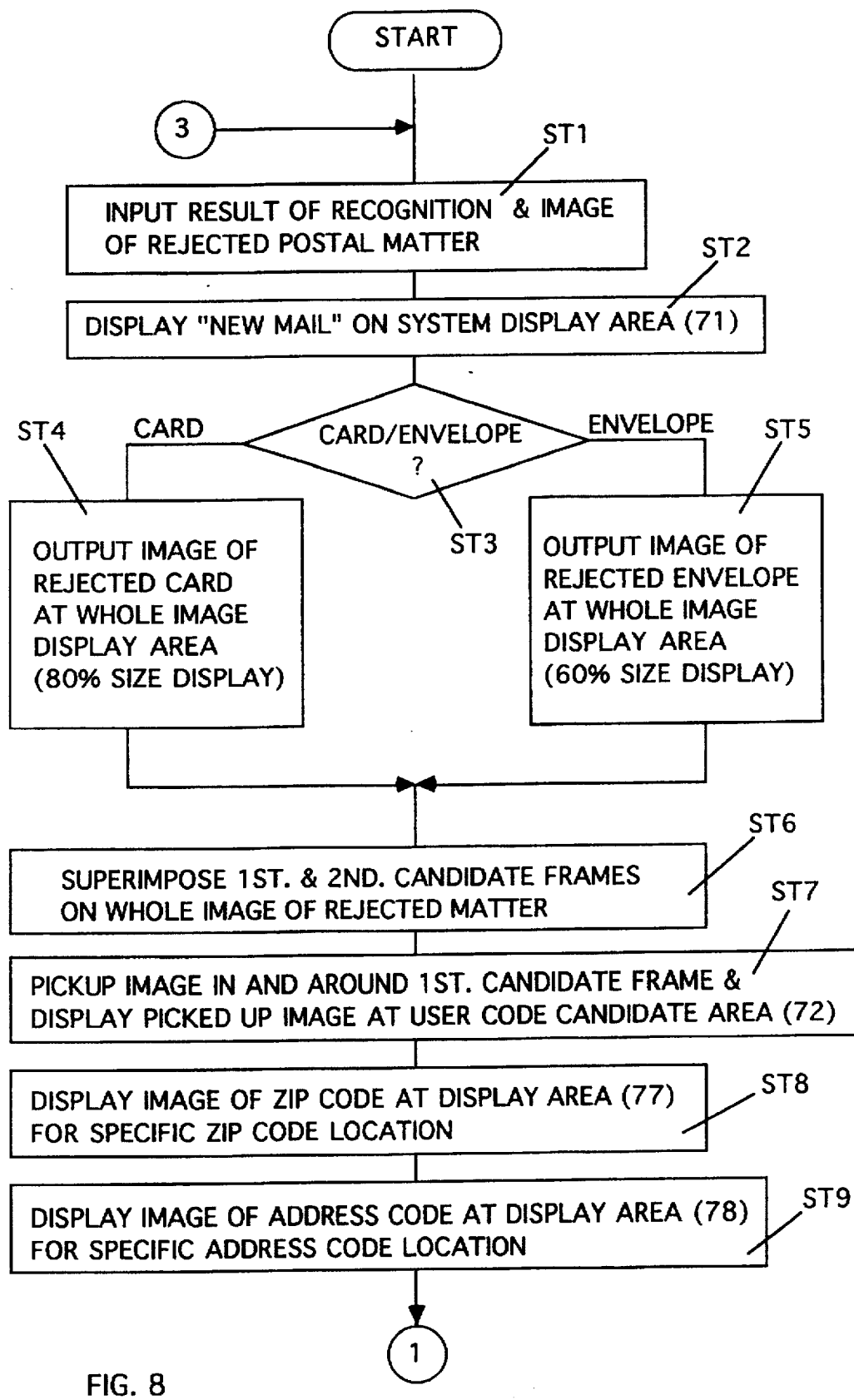
FIGS. 8 to 10 are flow charts for explaining how a character code corresponding to a portion, which character/code & image reader 2 fails to recognize, is corrected/input by video coding apparatus 7 when character/code & image reader 2 cannot perfectly recognize the contents of user code (zip code/address code) 41 written on the envelope in FIG. 1 (processing in these flow charts is executed by the computer incorporated in controller 35 in FIG. 5)
Figure 9:
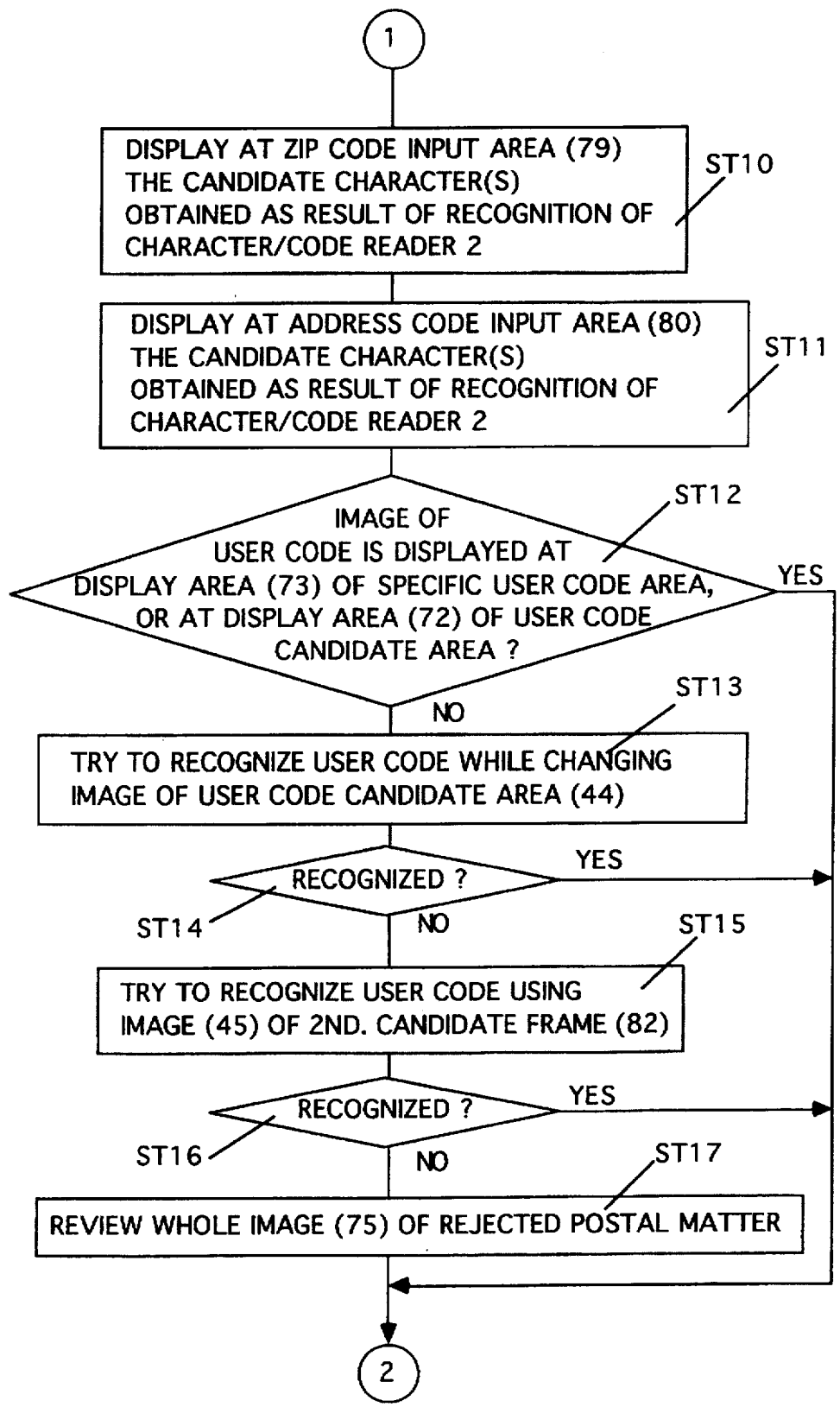

When the pieces of image information are displayed at image display areas 77 and 78 in step ST9 in FIG. 8, the flow advances to step ST10 in FIG. 9 to read out data from recognized zip code storage area 58 of memory 34, thereby displaying "☐☐☐-18", as a result of recognition obtained by character/code & image reader 2, at zip code input area 79 of display device 32. This portion "☐☐☐" (upper three digits) is enclosed with a color frame, and all the three digits are blinked. As data is sequentially input from the first digit, blinking of the corresponding digits is sequentially stopped. This blinking display processing will be described later with reference to FIG. 11.

In this embodiment, the first and third digits of the upper three digits of the zip code cannot be read by character/code & image reader 2. That is, the number of read-failed digits is more than one. In this case, an input operation for all the upper three digits is performed. This is because an input operation can be more efficiently performed for all the digits (three digits) than only for the read-failed digits. However, an input operation may be performed only for the read-failed digits. If only one digit cannot be read, an input operation can be more efficiently performed only for the read-failed digit than for all the digits.

Subsequently, data is read out from recognized address code storage area 59 of memory 34 to display "☐-3-5", as a result of recognition obtained character/code & image reader 2, at address code input area 80 of display device 32 (step ST11). In this case, the display operation is performed by the same display method as that for zip code input area 79 described above. However, the frame of the first digit of area 80 is not blinked until input of a zip code in zip code input area 79 is completed.

In order to allow the operator to easily discriminate a zip code and an address code, for example, the entire area of image display area 77 of specific zip code location 42 and zip code input area 79 is displayed in light sky blue, whereas the entire area of image display area 78 and address code input area 80 is displayed in light blue.

Figure 10:
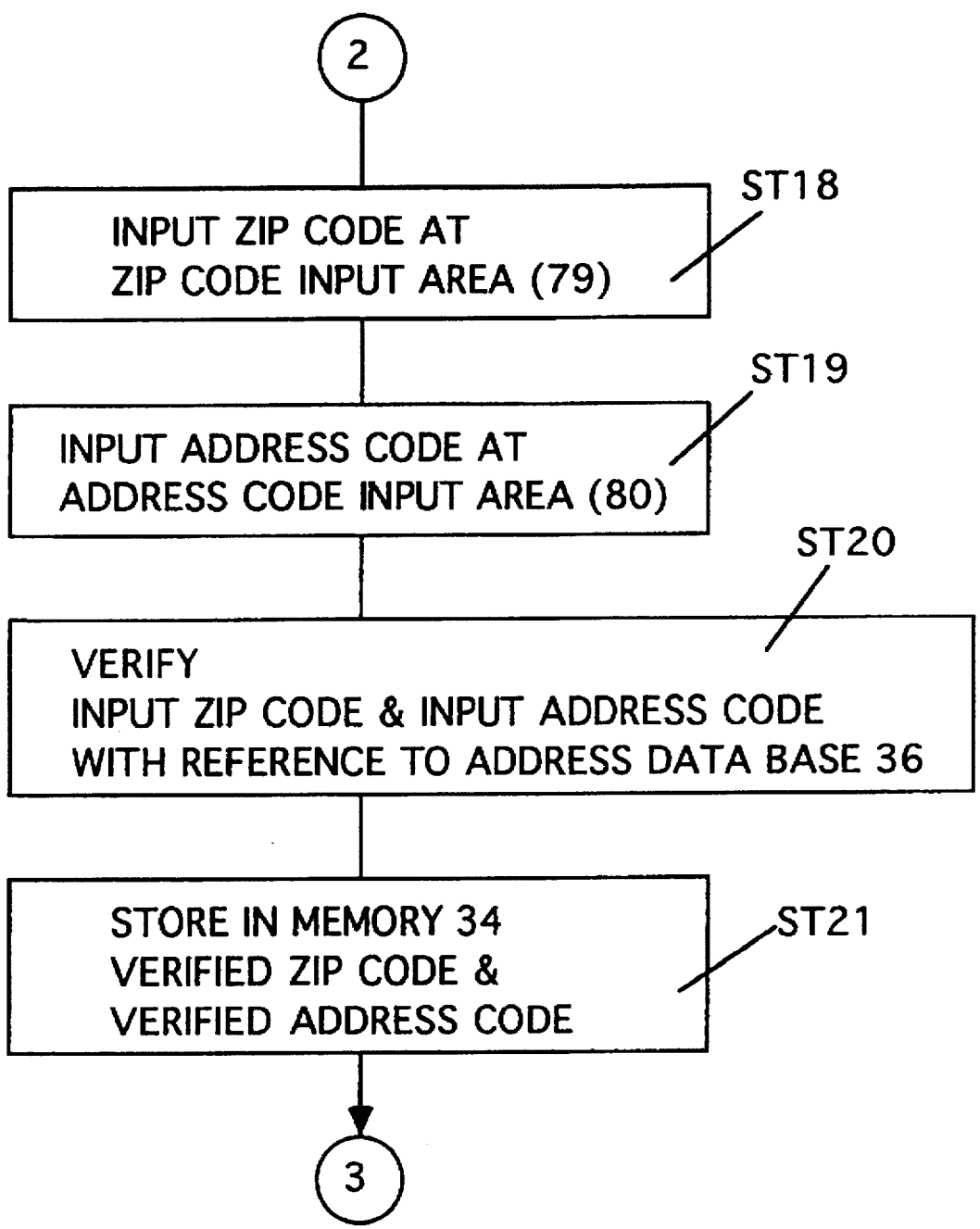

If the operator can recognize a user code (YES in step ST12) by visually checking the initial screen (image display area 72 of user code candidate area 44 or 45 or image display area 73 of specific user code location 41), the flow advances to step ST18 in FIG. 10. If the operator cannot recognize a user code (NO in step ST12), the flow advances to step ST13 to perform an image operation such as rotation, enlargement, reduction, or scrolling at image display area 72 of user code candidate area 44 of display device 32. With this operation, the operator recognizes the user code (YES in step ST14).

The above image operation is performed by using image work area 60 of memory 34. Assume that reduction processing is performed after rotation processing. In this case, the operator performs rotation processing of an image in whole image area 53 of memory 34 by using input device 33, and writes the processing result in image work area 60. The rotated image is displayed at image display area 72 of display device 32. The operator then performs reduction processing of rotated image data written in image work area 60.

If a user code can be recognized with the above operation (YES in step ST14), the flow advances step ST18 in FIG. 10.

If a user code cannot be recognized even if an image operation is performed in step ST13 (NO in step ST14), the flow advances to step ST15. In step ST15, second candidate frame 82 is designated in whole image display area 75 of display device 32 to display an image of second user code candidate area 45 at image display area 72 of the user code candidate area, and an image operation such as rotation, enlargement, reduction, or scrolling is performed in the same manner as described above.

If a user code cannot be recognized even from the second candidate (NO in step ST16), the user code is recognized by visually checking the whole image of whole image display area 75 (step ST17).

If the user code can be recognized with the image operation in step ST15 (YES in step ST16), or the user code can be read out from the whole image displayed in step ST17, the flow advances to step ST18 in FIG. 10.

In step ST18, the operator inputs a zip code at zip code input area 79 while visually checking image display area 77 of specific zip code location 42 of display device 32. In this case, the result of recognition obtained by character/code & image reader 2 is displayed at zip code input area 79 in advance, and digits to be corrected by an input operation are blinked. Therefore, data are input in the blinked digits by operating the keyboard of input device 33.

The operator can complete the coding input operation in this embodiment by continuously inputting "5", "4", and "3" through the keyboard without operating the confirmation key. Characters input through the keyboard are sequentially displayed at zip code input area 79.

In the mode of correcting only read-failed portions, if a skip key function is assigned to each function key (e.g., "F2"="skip to second digit from leftmost digit of zip code"; "F3"="skip to third digit"; "F4"="skip to fourth digit"; and "F5"="skip to fifth digit"), the input cursor position can be directly moved to a read-failed digit by using one of the function keys, and a code input operation can be performed at the input cursor position. In addition, a command key for confirming both the zip code input mode and the address code input mode at once may be assigned to function key "F12".

The operator then inputs data for a read-failed portion ("☐") of the address code at address code input area 80 while visually checking image display area 78 of specific address code location 43 (step ST19). If there is only one read-failed digit in the address code, only the read-failed digit is corrected. If the number of read-failed digits is more than one, all digits are input.

In a display operation, if only one digit cannot be read, only the read-failed digit is displayed with a color frame. If two or more digits cannot be read, all digits are displayed with color frames. A blinking display is performed in the same manner as that for image display area 77 of specific zip code location 42.

A coding input operation in this embodiment, therefore, is completed when the operator consecutively types only key "8" and key "return".

The input result of the user code input in this manner is written in input user code storage area 61 of memory 34.

When the processing in step ST19 is completed, the user code input result written in input user code storage area 61 of memory 34 is verified with reference to address data base 36 (step ST20). The verification result is then written in verified code storage area 62 of memory 34 (step ST21).

If the verification result indicates a correct code, the user code in input user code storage area 61 of memory 34 is transferred to bar code printer 3 and converted into bar code information. The bar code information is then printed on corresponding postal matter P.

If the verification result indicates an incorrect code, the incorrect data is transferred to bar code printer 3 and converted into bar code information. The bar code information is then printed on corresponding postal matter P.

When input of the user code is completed in this manner, a message "CODING IS COMPLETED" is displayed at system display area 71 of display device 32 (step ST2), and the whole image of next rejected postal matter P is displayed. Thereafter, a message "NEW MAIL" is displayed (step ST2). If there is rejected postal matter P to be processed next, an operation similar to the above operation is repeated.

Figure 11:
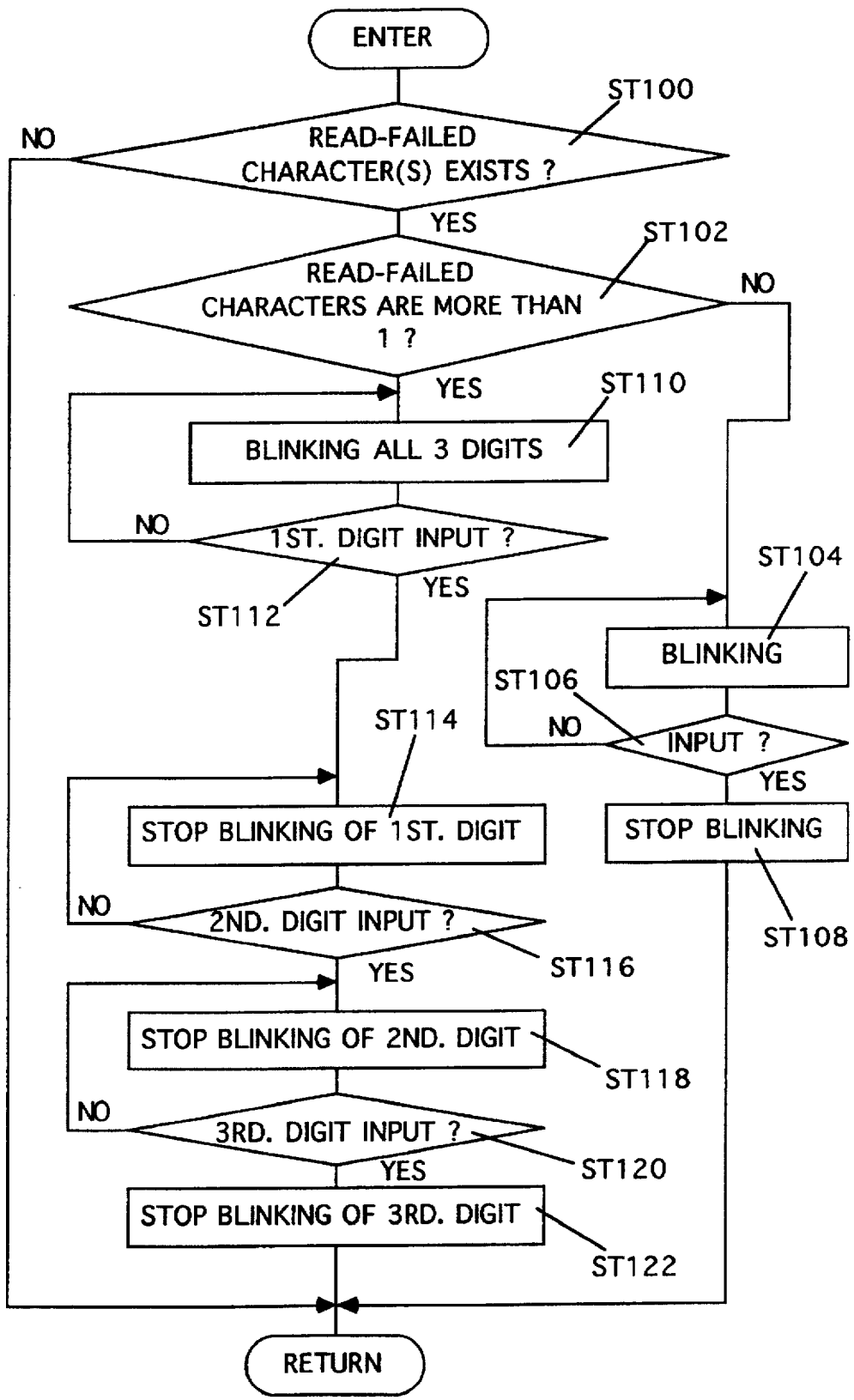
FIG. 11 is a flow chart for explaining how display processing of a non-input portion in user code input area 74 in FIG. 7 is performed in zip code input processing in step ST18 or address code input processing in step ST19 in FIG. 10 (processing in this flow chart is executed by the computer incorporated in controller (CPU) 35 in FIG. 5)

FIG. 11 is a flow chart for explaining blinking display processing of non-input portions in user code input area 74 in FIG. 7 in the zip code input processing in step ST18 or the address code input processing in step ST19 in FIG. 10.

This blinking display processing is performed differently depending on whether character/code & image reader 2 fails to read one or plurality of characters. If there is no read-failed character (NO in step ST100), blinking processing is not performed. If read-failed character(s) exists (YES in step ST100), the number of read-failed characters is checked. If the number of read-failed characters is one (NO in step ST102), only the input portion for the corresponding character is blinked (step ST104) to wait for an input operation for the portion by the operator (NO in step ST106).

When input of one character in the blinked character input area (74 in FIG. 7) is completed (YES in step ST106), the blinking display ends (step ST108). The flow then returns to step ST20 in FIG. 10.

If the number of read-failed characters is more than one (YES in step ST102), all the input portions for the group of read-failed characters (three digits in this case) are blinked (step ST110) to wait for an input operation for the portions by the operator (NO in step ST112).

When the operator inputs a character in the first digit of the blinked character input portions (YES in step ST112), blinking of the first digit is stopped (step ST114), and the input portions for the remaining two digits are blinked to wait for an input operation for the portions by the operator (NO in step ST116).

When the operator inputs a character in the second digit of the blinked character input portions (YES in step ST116), blinking of the second digit is also stopped (step ST118), and the input portion for the remaining one digit is blinked to wait for an input operation for the portion by the operator (NO in step ST120).

When the operator inputs a character in the third digit of the blinked portion (YES in step ST116), blinking of the third digit is also stopped (step ST122), and blinking of all the input portions is stopped (step ST122).

With the above processing, the operator of video coding apparatus 7 can immediately recognize the position of a read-failed character owing to blinking. Therefore, eyestrain can be reduced. In addition, since a character input portion is designated upon blinking processing, the cursor need not be moved to the blinking position for a character input operation, and the keystroke count required for a character input operation can be minimized.

A second example in which a user code is written in an area other than specific user code location 41 will be described next.

In this case, a user code is often written by printing. In addition, the user code is often written, as address information, in address information area Assume that postal matter P to be handled in this embodiment is a printed postcard, as shown in FIG. 2. Assume that a user code is written on a label (stuck on postal matter P) on which an address including a user code is printed by a sender using a wordprocessor or the like. Therefore, the user code is not written in specific user code location 41. In this case, the user code is "543-18 (zip code), 8-3-5 (address code)".

Steps ST1 to ST7 in FIG. 8 in this example are performed in the same manner as in the first example (FIG. 7), and the flow advances to step ST8.

In step ST8, data is read out from specific zip code location information area 56 of memory 34 to display only a designated frame (no data is written in the designated frame) at image display area 77 for a specific zip code location of display device 32 at a magnification of 100%, as shown in FIG. 12.

The flow then advances to step ST9 to read data from specific address code location information area 57 of memory 34 to display a designated area (no data is written in the designated area) at image display area 78 for a specific address code location of display device 32 at a magnification of 100%, as shown in FIG. 12.

In this case, similar to the first example (FIG. 7) described above, image display area 77 for the specific zip code location and image display area 78 for the specific address code location are displayed in color to allow the operator to easily recognize them.

Subsequently, the flow advances to step ST10 in FIG. 9. Since no zip code is written in specific zip code location 42, even if data is read out from recognized zip code storage area 58, no candidate character is displayed at zip code input area 79, and the color frames of the upper three digits are blinked. Typed characters are sequentially displayed at zip code input area 79.

The flow then advances to step ST11. Since no address code is written in specific address code location 43, even if data is read out from recognized address code storage area 59, no candidate character is displayed at address code input area 80. Note that the frame is not blinked until input of a zip code is completed.

If the operator can recognize the user code (YES in step ST12) by visually checking the initial screen (image display area 72 of a user code candidate area or whole image display area 75), the flow advances to step ST18. If the operator cannot recognize the user code (NO in step ST12), the flow advances to step ST13, and the same processing as that performed in the first example (FIG. 7) is performed up to step ST17. The flow then advances to step ST18 in FIG. 10.

In step ST18, when the operator recognizes the position of the user code by visually checking whole image display area 75 of display device 32, he/she inputs the user code at image display area 73. That is, in the case shown in FIG. 12, "5" "4" "3" "1" "8" "3" "5" and "return" are consecutively typed.

When the user code is input in this manner, steps ST19 to ST21 are performed in the same manner as in the first case (FIG. 7) described above. The flow then returns to step ST1 in FIG. 8. If there is rejected postal matter P to be processed next, the above operation is repeated.

Note that user code candidate areas (44 and 45) other than specific user code location 41 as a result of recognition by character/code & image reader 2, displayed on whole image display area 75, may be discriminated from specific user code location 41 by using frames consisting of different types of lines.

In addition, when the width of the area including a stamp and specific user code location 41 is almost equal to the width of postal matter, the area including the stamp and the specific user code location may not be displayed as a whole image on the initial screen.

In inputting a user code, the user code may be divided into a zip code and an address code so that the two codes can be independently corrected/input. If it is determined from the result of recognition obtained by character/code & image reader 2 that each code has only one digit to be corrected, a code input operation is performed with respect to only the digit to be corrected. If it is determined that each code has two or more digits to be corrected, a code input operation is performed with respect to all the digits.

In inputting the corrected code of an address code, if it is determined from the result of recognition obtained by character/code & image reader 2 that only one digit is to be corrected, a code input operation is performed with respect to only the digit to be corrected. If it is determined that two or more digits are to be corrected, a code input operation is performed with respect to all the digits.

When the corrected code of an address code is to be input, the address code is divided into three domains, e.g., "chome", "banchi", and "go" in Japan. If it is determined from the result of recognition obtained by character/code & image reader 2 that only one domain is to be corrected, a code input operation is performed with respect to only the domain to be corrected. If it is determined that two or more domains are to be corrected, a code input operation is performed with respect to all the domains.

When the corrected code of a zip code is to be input, the zip code is divided into upper digits corresponding to a sending division and lower digits corresponding to a delivery division. If it is determined from the result of recognition obtained by character/code a image reader 2 that only one digit of each division is to be corrected, a code input operation is performed with respect to only the digit to be corrected. If it is determined that two or more digits are to be corrected, a code input operation is performed with respect to all the digits.

Each of the above operations will be described in detail below. A case wherein a user code is written in specific user code location 41 will be described below with reference to FIG. 1. In this case, the user code is handwritten in most cases. An address code may not be written in specific address code location 43 but may be written, as address information, in first user code candidate area 44.

Assume that rejected postal matter P to be handled in this embodiment is an envelope on which a user code is handwritten, as shown in FIG. 1. Consider a case wherein the user code on postal matter P to be handled, which is "123-18 (zip code), 2-7-5 (address code)", is erroneously recognized as "128-18, 2-7-5" by character/code & image reader 2. That is, "8" at the third digit of the zip code is the only character which cannot be read.

The whole image of rejected postal matter P, input by input interface 31, is reduced/displayed (60% size display) at whole image display area 75 of display device 32.

In addition, first and second candidate frames 81 and 82 are superimposed on the displayed whole image to display areas which are considered by character/code & image reader 2 to include a user code. In this case, the frame displays are discriminated from each other with colors. That is, first candidate frame 81 is displayed in red; and second candidate frame 82, in green.

At the same time, an image of an area wider (120%) than first candidate area 81 is displayed at image display area 72 of user code candidate area 44 at a magnification of 100%.

A handwritten image of "123-18" is displayed at image display area 77 for a specific zip code location at a magnification of 100%, and a handwritten image of "2-7-5" is displayed at image display area 78 for a specific address code location at a magnification of 100%.

At zip code input area 79, "12-18" as a result of recognition obtained by character/code & image reader 2 is displayed. At address code input area 80, "2-7-5" as a result of recognition obtained by character/code & image reader 2 is displayed. In this case, since only one digit cannot be recognized, only this digit is blinked.

In order to allow the operator to easily discriminate a zip code and an address code, for example, the entire area of image display area 77 of specific zip code location 42 and zip code input area 79 is displayed in light sky blue, whereas the entire area of image display area 78 of specific address code location 43 and address code input area 80 is displayed in light blue. The operator may input "3" for the digit which cannot be recognized, thereby completing the processing.

If no user code is written, coding of the user code may be performed by using the address information in first user code candidate area 44 and the result of recognition obtained by character/code & image reader 2.

As described above, according to the above embodiment, when a user code is written in a specific user code location (located, for example, immediately below a red frame+a red frame) of postal matter, the result of recognition obtained by the character/code & image reader is displayed at a user code input area to allow correction of only a read-failed character, unlike the prior art in which all the characters of the user code must be input. Therefore, the keystroke count is considerably decreased, and the operation efficiently can be improved.

Since the user code input area is set immediately below the image display area of the specific user code location, the operator need not visually check the entire image display area and move his/her eyes. Therefore, the operator can quickly input a user code without eyestrain.

If no user code is written in the specific user code location of postal matter, a plurality of user code candidate areas which are considered to include a user code are displayed, thereby helping the operator to quickly find the user code. Therefore, the eyestrain can be reduced, and the operation efficiency can be improved.

As has been described in detail above, there is provided a video coding apparatus which allows an operator to perform a coding operation efficiently and tirelessly within a short period of time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A video coding system comprising:

obtaining means for obtaining an image of a postal matter having a specific user code area which is able to include a user code representing an address;

recognizing means for recognizing said user code of said postal matter from said image obtained by said obtaining means, wherein said postal matter is rejected as a rejected postal matter when said recognizing means has not recognized said user code completely;

receiving means for receiving information pieces from said recognizing means when said recognizing means incompletely recognizes said user code of said postal matter, said information pieces including:

whole image information representing a whole image of said rejected postal matter, attribute information including not less than zero candidate character obtained as a result of said incomplete recognition of said rejected postal matter, specific code location information representing said specific user code area of said rejected postal matter, and candidate area information representing a candidate area for said user code of said rejected postal matter other than said specific user code area;

display means for displaying display items in response to said whole image information, attribute information, specific code location information, and candidate area information respectively received by said receiving means, said display items including:

a whole view of said whole image of said rejected postal matter, a code area view of said specific user code area extracted from said whole view, a candidate area view of said candidate area extracted from said whole view, and a user code input area containing said candidate character; and inputting means for inputting a prescribed character to said user code input area displayed at said displaying means so as to provide a corrected user code, an input operation of said prescribed character by said inputting means being performed with reference to visual information obtained from at least one of said whole view, code area view, and candidate area view respectively displayed at said displaying means.

2. The system of claim 1, further comprising:
means for storing said corrected user code provided by said inputting means, together with said whole image information and said candidate area information respectively received by said receiving means with respect to said rejected postal matter.

3. The system of claim 2, further comprising:
means for adding to said postal matter a particular code corresponding to one of said corrected user code stored by said storing means and said user code successfully recognized by said recognizing means.

4. The system of claim 1, wherein said displaying means includes means for arranging said display items such that a location of said user code input area is adjacent to a location of said candidate area view.

5. The system of claim 1, wherein said displaying means includes means for arranging said display items such that a size of said candidate area view is not less than a size of a portion of said whole view corresponding to said candidate area view.

6. The system of claim 1, wherein a location of said specific user code area on said postal matter is preselected as a zip code location often used for postal matters other than said rejected postal matter.

7. The system of claim 1, wherein a location of said candidate area on said postal matter is preselected as an outside address location often used for postal matters other than said rejected postal matter.

8. The system of claim 1, wherein said candidate area information included in said information pieces received by said receiving means has first and second candidate areas for said user code of said rejected postal matter,
wherein a first location of said first candidate area on said postal matter is preselected for an outside address often used for postal matters other than said rejected postal matter, and
wherein a second location of said second candidate area on said postal matter is preselected for one of a stamp and a print of an organization relating to said outside address.

9. The system of claim 8, wherein said displaying means includes:
first showing means for showing images of said first and second candidate areas in said whole view of said rejected postal matter; and
second showing means for showing said image of said first candidate area in said candidate area view.

10. The system of claim 1, wherein said inputting means inputs one character of said user code to said user code input area displayed by said displaying means when said recognizing means fails to recognize only said one character of said user code of said rejected postal matter, and
wherein said inputting means inputs full characters relating to unrecognized characters of said user code to said user code input area when said recognizing means fails to recognize at least two characters of said user code of said rejected postal matter, said full characters containing said at least two unrecognized characters as well as not less than zero character displayed in said candidate area view.

11. The system of claim 10, further comprising:
means for blinking at least one input area of said user code input area, said at least one input area being provided for inputting a prescribed character of said user code not recognized by said recognizing means; and
means for stopping a state of blinking said input area to which said prescribed character has been input by said inputting means.

12. A video coding system for processing postal matters that each have a specific place where a user code relating to an address can be written, said system comprising:
information reading means for reading information provided on each of said postal matters, said information reading means including:
a user code recognizer for recognizing said user code so as to provide a recognized user code, for separating from said postal matters a rejected postal matter from which said user code cannot be recognized completely and for providing incompletely unrecognized user codes, and
an output stage for outputting image data of said rejected postal matter containing an image of the specific place where the user code can be written and user code candidate data containing said incompletely recognized user codes provided by said user code recognizer;
receiving means for receiving from said output stage of said information reading means said user code candidate data as well as said image data of said rejected postal matter containing an image of said specific place on said postal matters where said user code can be written, wherein said image data of said rejected postal matter received by said receiving means includes data of a whole image of said rejected postal matter;
display means for displaying data items in response to said user code candidate data and said image data of said rejected postal matter received by said receiving means, said display means including:
a first display area for displaying at least one character corresponding to said incompletely recognized user code provided by said user code recognizer, and an input place for inputting at least one other character corresponding to an unrecognized part of said user code, and
a second display area, aligned with said first display area, for displaying said image of said specific place where said user code can be written,
a third display area for displaying a prescribed image showing a prescribed portion of said rejected postal matter including an area other than said specific place where said user code can be written, wherein said prescribed place is predetermined as a common place containing address information of said postal matters,
a fourth display area for displaying said whole image of said rejected postal matter; and
inputting means for inputting, at said input place of said first display area, said at least one character of said unrecognized part of said user code based on a content of said image displayed at said second display area.

13. The system of claim 12, wherein said display means includes means for superimposing said fourth display area on a frame enclosing said prescribed image of said third display area.

14. An apparatus for processing postal matters that each have a specific place where a user code relating to an address can be written, said apparatus comprising an information reader for reading information provided on each of said postal matters and for outputting image data of a rejected postal matter and user code candidate data containing incompletely recognized user codes from said rejected postal matter, and a receiver for receiving, from said information reader, said user code candidate data as well as said image data of said rejected postal matter containing an image of said specific place on said postal matters where said user code can be written, wherein said image data of said rejected postal matter received by said receiver includes data of a whole image of said rejected postal matter, said apparatus comprising:

display means for displaying data items in response to said user code candidate data and said image data of said rejected postal matter received by receiver, said display means including:

a first display area for displaying at least one character corresponding to said incompletely recognized user codes, and an input place for inputting at least one other character corresponding to an unrecognized part of said user code, and a second display area, aligned with said first display area, for displaying said image of said specific place where said user code can be written, a third display area for displaying a prescribed image showing a prescribed portion of said rejected postal matter including an area other than said specific place where said user code can be written, wherein said prescribed place is predetermined as a common place often containing an address information of said postal matters, and a fourth display area for displaying said whole image of said rejected postal matter; and inputting means for inputting, at said input place of said first display area, said at least one character of said image displayed at said second display area.

15. The system of claim 14, wherein said display means includes means for superimposing said fourth display area on a frame enclosing said prescribed image of said third display area.

16. A video coding system for processing postal matters that each have a specific place where a user code relating to an address can be written, said system comprising:

information reading means for reading information provided on each of said postal matters, said information reading means including:

a user code recognizer for recognizing said user code so as to provide a recognized user code, for separating from said postal matters a rejected postal matter from which said user code cannot be recognized completely and for providing incompletely recognized user codes, and an output stage for outputting image data of said rejected postal matter and user code candidate data containing said incompletely recognized user codes provided by said user codes recognizer;

receiving means for receiving from said output stage of said information reading means said user code candidate data as well as said image data of said rejected postal matter containing an image of said specific place on said postal matters where said user code can be written, said received image data including data of a whole image of the rejected postal matter;

display means for displaying data items in response to said user code candidate data and said image data of said rejected postal matter received by said receiving means, said display means including:

a first display area for displaying at least one character corresponding to said incompletely recognized user code provided by said user code recognizer, and an input place for inputting at least one other character corresponding to an unrecognized part of said user code, and a second display area, located adjacent to said first display area, for displaying said image of said specific place where said user code can be written, and a third display area for displaying said whole image of said rejected postal matter; and inputting means for inputting, at said input place of said first display area, said at least one character of said unrecognized part of said user code based on a content of said image displayed at said second display area.

17. The system of claim 16, wherein said display means includes means for superimposing said third display area on a frame enclosing a prescribed image.

18. The system of claim 16, wherein said display means has a fourth display area for displaying a prescribed image showing a prescribed place of said rejected postal matter other than said specific place, and wherein said prescribed place is predetermined as a common place often containing an address information of postal matters other than said rejected postal matter.

19. The system of claim 18, wherein said prescribed image includes an area for describing address information.

20. An apparatus for processing postal matters that each have a specific place where a user code relating to an address can be written, said apparatus including an information reader for reading information provided on each of said postal matters and for outputting image data of a rejected postal matter and user code candidate data containing incompletely recognized user codes from said rejected postal matter, and a receiver for receiving from said information reader said user code candidate data as well as said image data of said rejected postal matter containing an image of said specific place on said postal matters where said user code can be written, said image data received by said receiver including data of a whole image of said rejected postal matter, said apparatus comprising:

display means for displaying data items in response to said user code candidate data and said image data of said rejected postal matter received by said receiver, said display means including:

a first display area for displaying at least one character corresponding to said incompletely recognized user code, and an input place for inputting at least one other character corresponding to an unrecognized part of said user code, and a second display area, located adjacent to said first display area, for displaying said image of said specific place where said user code can be written, and a third display area for displaying said whole image of said rejected postal matter; and inputting means for inputting, at said input place of said first display area, said at least one character of said unrecognized part of said user code based on a content of said image displayed at said second display area.

21. The apparatus of claim 20, wherein said display means includes means for superimposing said third display area on a frame enclosing a prescribed image.

22. The apparatus of claim 20, wherein said display means has a fourth display area for displaying a prescribed image showing a prescribed place of said rejected postal matter other than said specific place, and wherein said prescribed place is predetermined as a common place often containing an address information of postal matters similar to said rejected postal matter.

23. The system of claim 22, wherein said prescribed image includes an area for describing address information.

* * * * *